Feb. 22, 1949.  E. P. DE CRAENE  2,462,809
ADJUSTABLE STOP FOR GATE VALVES
Filed Nov. 13, 1945  3 Sheets-Sheet 1

Inventor:
Edmond P. DeCraene
By: Joseph O. Lange
Atty.

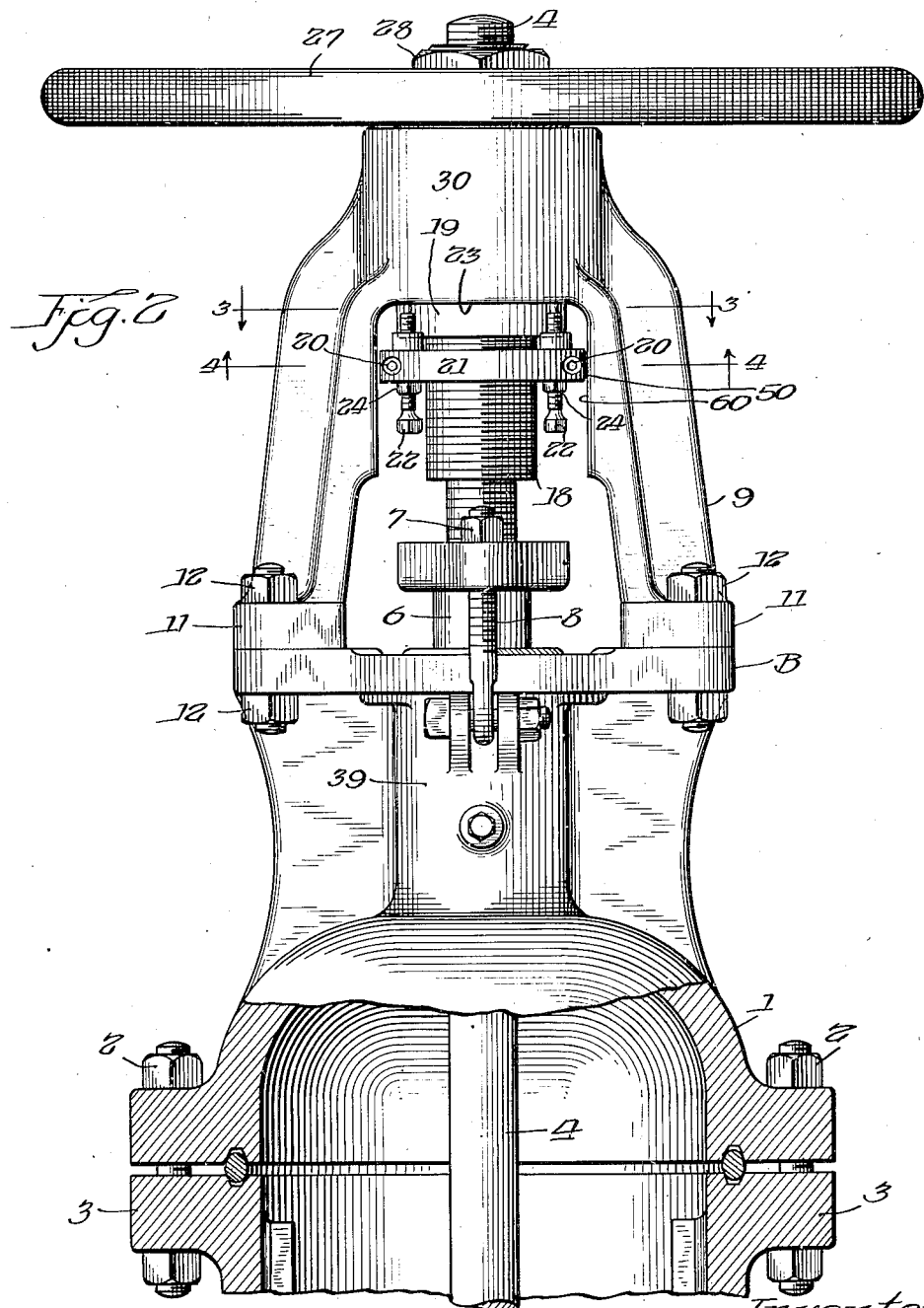

Feb. 22, 1949.  E. P. DE CRAENE  2,462,809
ADJUSTABLE STOP FOR GATE VALVES
Filed Nov. 13, 1945  3 Sheets-Sheet 3
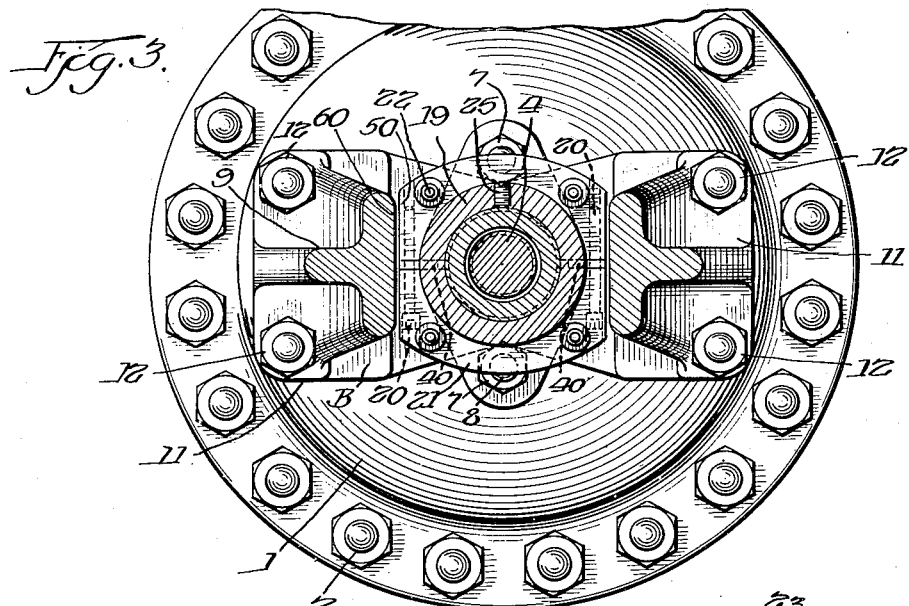
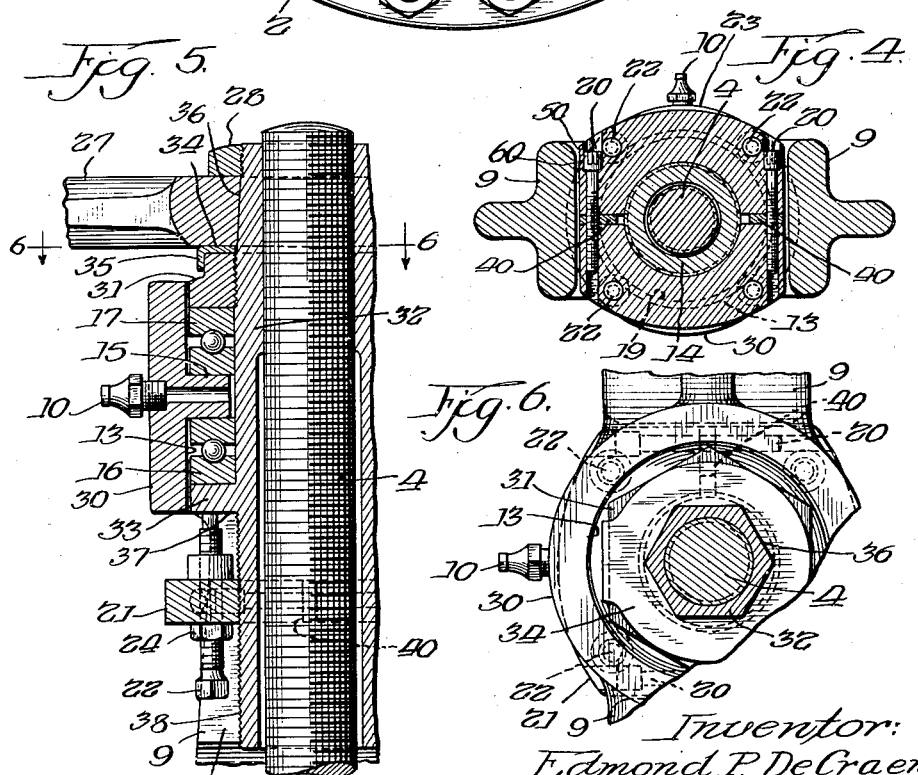
Inventor:
Edmond P. DeCraene
By: Joseph O. Lange Atty.

Patented Feb. 22, 1949

2,462,809

UNITED STATES PATENT OFFICE 2,462,809

ADJUSTABLE STOP FOR GATE VALVES

Edmond P. De Craene, Westchester, Ill., assignor to Crane Co., Chicago, Ill., a corporation of Illinois Application November 13, 1945, Serial No. 628,029

14 Claims. (Cl. 74—424.8)

This invention relates to an adjustable stop device suitable for cooperation with the actuating mechanism for gate valves and the like. More particularly it relates to an adjustable position stop for gate valves or similar valves whereby the valve closure member may be very accurately positioned insofar as its ultimate seating within the valve body or casing is concerned.

In order to obtain a better and more complete understanding of the background of this contribution to the valve art it should be understood that in connection with wedge gate valves for example it is quite desirable especially where high temperatures are employed to seat the valve with a predetermined load or seat bearing contact relative to the valve seats. More specifically when wedge gate valves are seated under circumstances in which the valve body and actuating mechanism is substantially expanded under the influence of elevated temperatures, excessively high seating loads result with objectionable stresses being placed on the stems and valve bodies. Prior to the contribution of my invention it has been found that wedge gate valves have been subjected to extremely high internal stresses as, for example, when the line was later cooled, contraction of the valve body occurred. The wedge disc or closure being seated while hot would then serve as a means for introducing terrific strains even to the extent of causing an actual rupture of the valve body. Thus it has been desirable to provide some convenient means whereby the valve closure member could be seated without permitting the operator, whether human or mechanical, to close the valve with more than the necessary seating torque to effect seat tightness.

By the application of my novel device the seating of the closure member is not left to the discretion of the operator but instead by means of the installed stop constituting this invention the valve closure member is seated with a predetermined load, thus avoiding the objections above referred to. The stop adjustments can be conveniently made at the time of testing by the manufacturer, then sealed against tampering and be suitable for the high temperature service desired without further attention by the operator as to the amount of seating torque to be applied.

Another important object of this invention is to provide an adjustable position stop for gate valves in which there are no torsional strains applied to the operating stem. Further the arrangement is relatively compact and can be applied to most valves without increasing the overall height of the valve. It is reasonably economical to manufacture and convenient to install, inspect or replace whenever necessary.

Other important objects and advantages will become more readily apparent upon proceeding with a description of the invention considered in light of the following specification and the accompanying drawings in which Fig. 1 is a fragmentary sectional assembly view of the upper portion of a conventional valve embodying my invention.

Fig. 2 is a side external fragmentary view of the assembly shown in Fig. 1.

Fig. 3 is a sectional view taken on the line 3—3 of Fig. 2.

Fig. 4 is a sectional view taken on the line 4—4 of Fig. 2.

Fig. 5 is a fragmentary sectional view of a modified form of my invention.

Fig. 6 is a sectional view of the modified form taken along the line 6—6 of Fig. 5.

Figure 1:
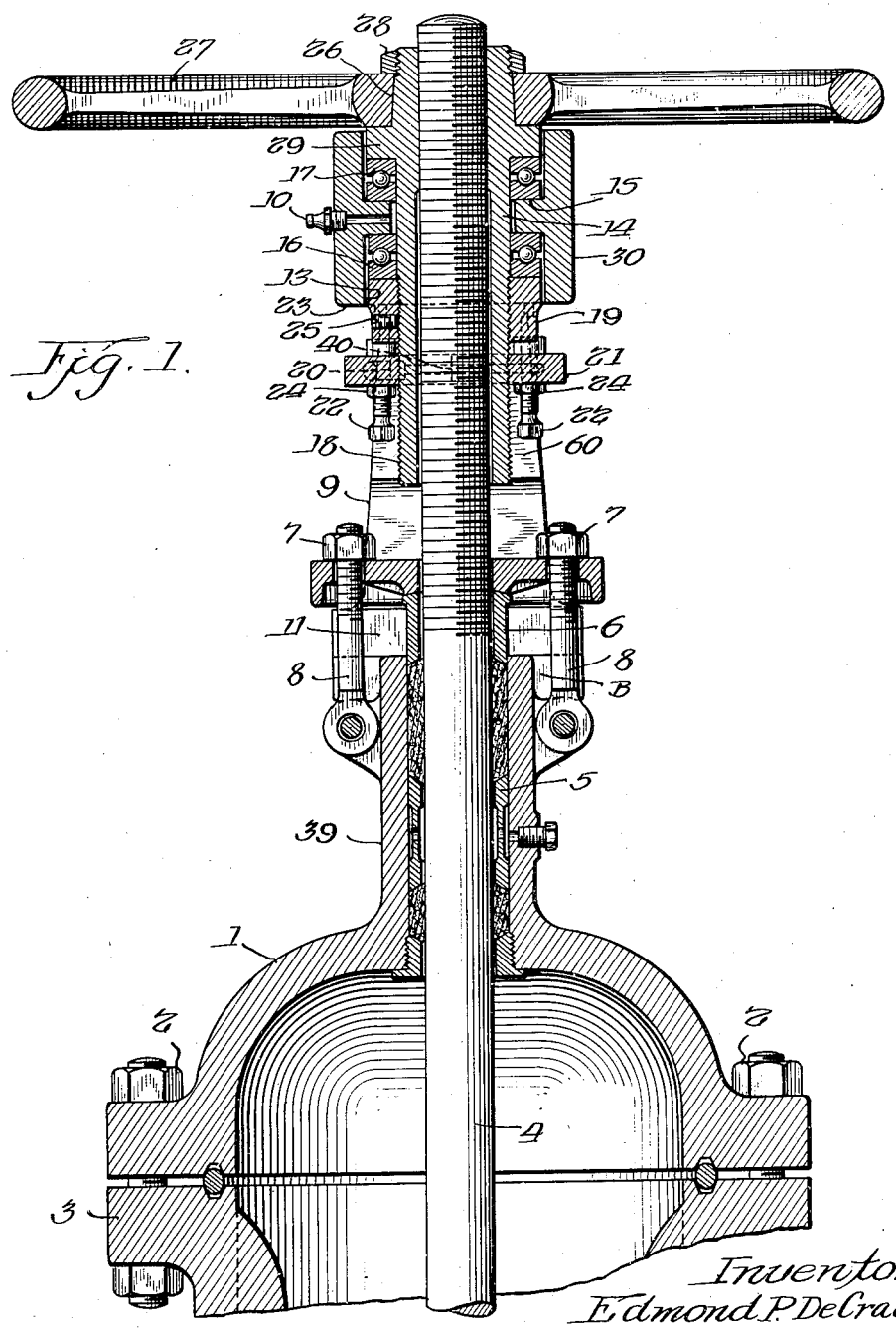

Referring now to Fig. 1, the installation of my invention is shown as applied to what is termed an outside screw and yoke gate valve by those skilled in the art. The lower portion of the gate valve below the bonnet or cover member 1 has not been shown because of being deemed unnecessary in setting forth my invention. Thus the bonnet has the usual extension 39 and the bolts 2 for attachment to a valve body flange 3. Journalled within the bonnet is the valve stem 4 which is of the reciprocating or rising stem type, and at its lower portion (not shown) is connected with the valve closure member of the wedge type, as of the type shown for example in U. S. Patent No. 2,140,934, dated Dec. 20, 1938.

While reference is made herein of applying this invention to a wedge type of gate valve, it is equally applicable to a parallel seat gate valve in which a positive and accurate stop is desirable in connection with the actuating mechanism to prevent grounding of the closure member against the bottom of the valve casing. The invention may also be used with globe and angle valves in such cases where a predetermined torque in seating the closure member is advantageous. It should be apparent that it is susceptible of wide application.

Projecting through the upper portion of the bonnet 1 the stem 4 passes through the usual stuffing box generally referred to as 5 and having the packing gland 6 and the usual nuts 7 on the eye-bolts 8 for the purpose of compressing the stuffing box packing illustrated in the conventional manner. Mounted upon the flange portion B of the bonnet is the yoke 9 having the yoke pads 11 attached by means of bolts 12 to the bonnet flange B. At the upper portion of the yoke 9 within the hub 30, it is recessed as indicated at 13 to allow for receiving and positioning of the yoke sleeve 14 the recess 13 having an inner annular shoulder 15 within which on both sides are mounted the lower and upper thrust bearings 16 and 17 respectively and having the lubricating fitting 10. The lower portion of the yoke sleeve is provided with a threaded extension 18, the threaded extension serving in a dual capacity, first, to threadedly support the annular member 19 for holding the bearing 16 and yoke sleeve 14 in position, and below to threadedly support the divided plate 21, the latter being made in two halves and being held together by the screws 20. Placed between the halves are the spaced pieces 49 for providing a snug assembly of the divided plate in predetermined position on the threads of the extension 18. These threads are intentionally threaded oppositely in lead to the yoke sleeve threads for the stem so that upon rotation of the yoke sleeve in a clockwise or closing direction the plate 21 will ride upwardly upon the threads of the extension 18, its stop being determined as hereinafter explained.

In order to prevent rotation of the divided plate 21 while traveling up and down on the oppositely threaded shank 18 of the yoke sleeve 14 as shown in Fig. 3 when the yoke sleeve 14 is rotated the plate provided with flats or sides 50 slidably bears against a similarly flattened portion 60 within the yoke 9. As shown more clearly in the plan view of Fig. 3, the divided plate 21 is preferably provided with a plurality of adjusting screws 22, threadedly mounted to bear against the under surface 23 of the yoke hub 30 to limit the aforesaid travel of the plate 21 when the valve is in desired seated position as determined by seat tightness under actual tests. The adjusting screws are held in locked position by means of the locknuts 24 when such desired adjustment as referred to has been obtained. The annular threaded member 19 is preferably held in its locked threaded assembly with the yoke sleeve 14 by means of the dog point set screw 25.

The yoke sleeve 14 at its upper end is provided with the usual polygonal end portion 26 upon which the handwheel 27 is non-rotatedly mounted, the latter being held in place by means of the yoke sleeve nut 28. From the foregoing, it will be apparent that the travel of the divided plate 21 is proportional to the travel or lift of the closure member and is measurable in inches by dividing the number of threads per inch on the valve stem into the number of threads per inch on the threaded extension 18 of the yoke sleeve 14. For example, in a 6" valve having a 7" lift and provided with 3½ threads per inch (left hand) on the valve stem and with 11½ threads per inch (right hand) on the yoke sleeve extension 8 the applied formula would then be as follows:

Travel of the divided plate 21 (in inches) =

$$7 \times \frac{3.5}{11.5} = 2\frac{1}{8} \text{ inches (approx.)}$$

It should be clear that in order to prevent tampering the locknuts 24 may of course be suitably sealed and wired after the adjusted positioning of the closed valve has been determined.

It will be apparent that an easy adjustment can be made in properly seating the valve closure member by simply stopping the upward travel of the plate 21 by having the screws 22 bear against the surface 23 of the yoke hub 30 after the yoke sleeve has been rotated by the handwheel 27 in seating the closure member as desired.

Referring now to the modified form of adjustable stop construction shown in Fig. 5 in order to avoid the use of the dog point set screws 25 and to permit the use of a solid ring as hereinafter referred to in the instant construction the internal shoulder portion 29 of the yoke sleeve in Fig. 1 is replaced by the threaded collar 31 at its upper portion and at the lower portion of the modified yoke sleeve 32 the internal shoulder 33 is provided to support the lower thrust bearing 16.

In this modified construction a lock washer 34 with a bent down end portion 35 is used to lock the threaded member 31 in position on the modified yoke sleeve 32. Depending from the under-surface 37 of the shoulder 33 is the threaded shank 38 upon which the plate 21 is mounted and is movable in the manner described in connection with Figs. 1 to 4 inclusive. The structure just described possesses the advantage of dispensing with the use of the lower member 19 and its lock screw 25 and in some valve installations may be more convenient to handle.

In connection with the modified form of Figs. 5 and 6, a divided plate 21 has been shown and described. However in this modification, it may be made without inconvenience in assembly as a solid annular ring threadedly movable on the shank 38 thus dispensing with the screws 20 and the spacer pieces 49. The divided plate 21 has been preferably used in connection with the construction of Figs. 1 to 4 inclusive, simply because it is more easily assembled with that arrangement of parts and avoiding critical handling, but with the modified form the solid ring will be free of difficulties in assembly and critical adjustment.

It will of course be clear that the embodiments herein shown and described are by way of illustration only and not by limitation. Therefore numerous variations in the structure may be made within the spirit of the invention as defined by the scope of the appended claims.

I claim:

1. In an adjustable position stop mechanism for valves of the character described, the combination including a yoke and a threaded reciprocably movable stem, a yoke sleeve threadedly journalled upon the said stem, means supporting the said yoke sleeve, means reciprocably movable relative to and supported by the said yoke sleeve upon predetermined rotation of the said yoke sleeve, and stop means cooperating with said reciprocably movable means to limit the axial movement of the said stem relative to the said yoke and yoke sleeve.

2. In a position stop mechanism for valves of the character described, the combination including a threaded reciprocably movable stem, a yoke sleeve threadedly journalled upon the said stem, yoke means supporting the said yoke sleeve, abutment means carried by the yoke sleeve and axially movable relative to the said yoke sleeve upon predetermined rotation of the said yoke sleeve and means cooperating with said abutment means to regulate the axial movement in at least a single direction of said stem relative to the said yoke sleeve.

3. In an adjustable position stop mechanism for valves, the combination comprising a reciprocably movable threaded stem, a yoke, a yoke sleeve rotatably mounted in said yoke for effecting said reciprocable movability of the valve stem, the yoke sleeve having a depending threaded portion, means cooperating with the yoke for retaining the said yoke sleeve in said yoke, a non-rotatable stop collar threadedly mounted upon the depending threaded portion of said yoke sleeve, adjustable means on the said stop collar for limiting end movement of said stop collar upon the said yoke sleeve at approximately the limit of axial movement of said stem in one direction.

4. In a closure member position stop mechanism for valves and the like, the combination comprising a threaded reciprocably movable non-rotatable valve stem, a rotatable yoke sleeve to threadedly receive the valve stem, a yoke having a hub portion for the support of the said yoke sleeve, an annular member cooperating with the said yoke and yoke sleeve for holding the latter member against longitudinal movement while permitting its rotational movement, a non-rotatable stop plate threadedly mounted and longitudinally movable relative to the said yoke sleeve, the said yoke having means for restraining the said stop plate against rotation, the longitudinal movement of the said stop plate being limited by abutment against a lower portion of the said yoke, means carried by the said stop plate for spacing the latter member in its end movement relative to the said yoke, means for rotating the said yoke sleeve.

5. An adjustable stop cooperating with the actuating mechanism of valves, the combination comprising a reciprocably movable threaded stem, a yoke, a rotatable, axially immovable yoke sleeve mounted on said yoke for effecting said reciprocable movability of the valve stem, the yoke sleeve having an annular threaded portion around a portion of the stem, the latter threaded portion having a lead opposite to the threads of the stem, a non-rotatable stop collar threadedly mounted upon the threaded portion of said yoke sleeve adjustable means cooperating with the collar for defining the end movement of the said stop collar, whereby upon rotation of the said yoke sleeve the said stop collar moves in an endwise direction opposite to the simultaneous endwise direction of movement of the said stem.

6. In an adjustable position stop for valve closure members, the combination comprising a reciprocably movable threaded stem, a yoke, a yoke sleeve mounted in the said yoke for effecting said reciprocable movability of the valve stem and having a depending oppositely threaded portion relative to the stem threads, means cooperating with an upper end of the oppositely threaded portion for retaining the said yoke sleeve against longitudinal movement, a non-rotatable stop plate threadedly mounted upon the oppositely threaded portion of said yoke sleeve, means on the said stop plate for limiting the transverse movement of said stop plate upon the oppositely threaded portion of said yoke sleeve when predetermined endwise limit of movement of the valve stem in an opposite direction and away from the yoke has been reached.

7. In an adjustable position stop for valves of the character described, the combination including a non-rotatable reciprocably movable stem, a threaded yoke sleeve rotatable relative to the said stem for effecting said reciprocable movability of the latter member, a yoke supporting the said yoke sleeve, threaded non-rotatable means on the yoke sleeve, means cooperating with the non-rotatable means of said yoke sleeve to adjust the limit of end movement of said latter means relative to the said yoke and yoke sleeve.

8. In an adjustable position stop for valves and the like, the combination comprising a threaded reciprocably movable non-rotatable valve stem, a yoke sleeve for effecting said reciprocable movability of the latter member and having a lower depending threaded portion, a yoke having an annular portion for the support of the said yoke sleeve, means cooperating with said annular portion of said yoke for holding the said yoke sleeve against longitudinal movement while permitting its rotational movement, a stop collar having a plurality of sections for threaded assembly around the lower depending threaded portion of the yoke sleeve and transversely movable relative thereto, threaded abutment means cooperating with the said stop collar for limiting the axial movement of the said stem relative to the said yoke.

9. In an adjustable position stop device for valves and the like, the combination comprising a threaded reciprocably movable valve stem, a yoke sleeve to journally receive the said stem for effecting said reciprocable movability of the latter member, a yoke having means for the support of the said yoke sleeve, means on the yoke sleeve for holding the latter member against longitudinal movement while permitting its rotational movement, a non-rotatable stop collar threadedly mounted and axially movable relative to the said yoke sleeve, the axial movement of the said stop collar in one direction being limited by that portion of the yoke forming the means for support of the said yoke sleeve, adjustable means cooperating with the said stop collar to define the limit of axial movement of the said stem into the said yoke sleeve.

10. In an adjustable position stop mechanism for valves or the like, the combination comprising a reciprocably movable non-rotatable stem, a yoke, a yoke sleeve rotatably mounted in the said yoke for effecting said reciprocable movability of the valve stem, the yoke sleeve having a depending oppositely threaded portion, shoulder means cooperating with the said yoke sleeve for retaining the said latter member against longitudinal movement, a stop plate mounted upon the threaded portion of said yoke sleeve, the said stop plate being divided for assembly on the threads of the depending portion of the yoke sleeve, means for holding the divided portions of the plate in assembled relation.

11. In a position stop mechanism for valves of the character described, the combination including a threaded reciprocably movable stem, a yoke sleeve threadedly journalled upon the said stem, a yoke supporting the said yoke sleeve, non-rotatable plate means mounted on the yoke sleeve and movable with the rotation of the said yoke sleeve to effect transverse movement of said plate means relative to the said yoke and yoke sleeve, the said yoke providing for the non-rotatability of the said plate means.

12. In an adjustable position stop for valves of the character described, the combination including a threaded reciprocably movable stem, a yoke sleeve threadedly journalled for rotation relative to the said stem, means holding the said yoke sleeve against longitudinal movement, adjustable collar means movable relative to said yoke sleeve whereby upon rotation of the latter member the transverse movement of said adjustable collar means is effected relative to the said yoke and yoke sleeve.

13. In an adjustable position stop for valves, the combination comprising a threaded reciprocably movable valve stem, a yoke sleeve therefor, a yoke having recess and inner shoulder portion for the support of the said yoke sleeve, means cooperating with the shoulder portion of said yoke for holding the yoke sleeve against longitudinal movement while permitting rotational movement, a non-rotatable stop plate threadedly mounted and movable longitudinally relative to the said yoke sleeve, the longitudinal movement of the said stop plate being limited in one direction by abutment against the said yoke, adjustable means carried by the said stop plate for regulating the movement of the said stop plate relative to the said yoke, means provided by said yoke sleeve for actuating the latter member.

14. In an adjustable position stop for gate valves and the like, the combination comprising a threaded reciprocably movable valve stem, a yoke sleeve, a yoke having a recess and inner shoulder portion for the support of the said yoke sleeve, means cooperating with the shoulder portion of said yoke for holding the yoke sleeve against longitudinal movement while permitting rotational movement, a stop collar threadedly mounted and longitudinally movable relative to the said yoke sleeve, the longitudinal movement of the said stop collar being limited by the said yoke, adjustable means carried by the said stop collar for regulating the longitudinal movement of the stop collar relative to the said yoke, means provided by the said yoke sleeve for actuating the latter member.

EDMOND P. DE CRAENE.

REFERENCES CITED

The following references are of record in the file of this patent:

UNITED STATES PATENTS

| Number | Name | Date |
| --- | --- | --- |
| 1,420,664 | Maxwell | July 27, 1922 |
| 1,586,393 | Astrom | May 25, 1926 |
| 1,705,232 | Brantingson | Mar. 12, 1929 |
| 1,844,246 | Fox | Feb. 9, 1932 |
| 2,150,813 | Ball | Mar. 14, 1939 |
| 2,205,634 | Sizer | June 25, 1940 |
| 2,317,529 | Hodgson | Apr. 27, 1943 |
| 2,351,211 | Hodgson | June 13, 1944 |

FOREIGN PATENTS

| Number | Country | Date |
| --- | --- | --- |
| 475,600 | Great Britain | Nov. 23, 1937 |